(12) United States Patent
Ewida

(10) Patent No.: US 8,675,804 B2  
(45) Date of Patent: Mar. 18, 2014

(54) BOILING WATER REACTOR FUEL SUPPORT CASTING FLOW LIMITER

(75) Inventor: Khaled M. Ewida, Garland, TX (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 611 days.

(21) Appl. No.: 12/968,906

(22) Filed: Dec. 15, 2010

(65) Prior Publication Data

US 2012/0152382 A1    Jun. 21, 2012

(51) Int. Cl.
    *G21C 7/32*    (2006.01)
(52) U.S. Cl.
    USPC ............................................ 376/210; 376/454
(58) Field of Classification Search
    USPC ......................... 376/210, 453–454
    See application file for complete search history.

(56) References Cited

U.S. PATENT DOCUMENTS

| | | | |
|---|---|---|---|
| 5,481,577 A * | 1/1996 | Yates et al. ..................... | 376/313 |
| 2005/0184007 A1* | 8/2005 | Allard et al. ............... | 210/512.2 |

* cited by examiner

*Primary Examiner* — Timothy A Brainard  
(74) *Attorney, Agent, or Firm* — Harness, Dickey & Pierce, P.L.C.

(57) ABSTRACT

A flow limiter may include a head and a fin extending from a bottom of the head. The head may include a side surface having at least one first hole and the side surface may be symmetric about a first axis. The fin may include at least one second hole and the at least one second hole may have an axis substantially perpendicular to the first axis. The flow limiter may be inserted into a support casting that may interface with a nuclear fuel bundle to reduce the flow of water to the nuclear fuel bundle thereby reducing a moisture carry over (MCO) level at an exit of a fuel bundle of a nuclear reactor.

19 Claims, 9 Drawing Sheets

BOILING WATER REACTOR FUEL SUPPORT CASTING FLOW LIMITER

BACKGROUND

1. Field

Example embodiments relate to a flow limiter that may reduce a moisture carry over (MCO) level at an exit of a fuel bundle of a nuclear reactor. Example embodiments also relate to a system that includes the flow limiter.

2. Description of Related Art

In conventional boiling water reactors, fuel assemblies including nuclear fuel rods are used to convert water to steam. The steam may be used for various purposes, for example, as a reheating medium or as a force to drive a turbine. In conventional nuclear reactor plants, the fuel assemblies interface with a fuel support casting.

During the operation of a boiling water reactor, water is supplied to a fuel bundle through a fuel support casting. Ideally, the water exits the fuel bundle as pure steam. However, after a certain number of cycles, a fuel bundle will inevitably become a low power bundle and will be moved to one of the outer, peripheral rows along with the other low power bundles. Nevertheless, even if a low power bundle is arranged in one of the outer, peripheral rows, the steam exiting the low power bundle may still contain an increased amount of water droplets if the amount of incoming water exceeds the ability of the low power bundle to convert all of the water to steam.

The amount of water droplets in the steam exiting a fuel bundle may be referred to as a moisture carry over (MCO) level. A high moisture carry over level may be detrimental to the operation of a boiling water reactor for at least two reasons. First, a high moisture carry over level may increase the amount of radiation exposure to plant operators. Second, a high moisture carry over level may cause damage to the blades of the steam turbine. Consequently, nuclear power plants typically opt to reduce core flow in order to decrease moisture carry over levels. However, a reduction in core flow results in a reduction in reactor power which ultimately results in decreased revenues.

SUMMARY

In accordance with example embodiments, a flow limiter may include a head and a fin extending from a bottom of the head. The head may include a side surface having at least one first hole and the side surface may be symmetric about a first axis. In example embodiments, the fin may include at least one second hole and the at least one second hole may have an axis substantially perpendicular to the first axis.

In accordance with example embodiments, a system may include a fuel support casting having at least one channel and a flow limiter in the at least one channel. In example embodiments, the flow limiter may include a head and a fin extending from a bottom of the head. The head may include a side surface having at least one first hole and the side surface may be symmetric about a first axis which is parallel to an axis of the at least one channel. In example embodiments the fin may include at least one second hole and the second hole may have an axis substantially perpendicular to the first axis.

BRIEF DESCRIPTION OF THE DRAWINGS

The various features and advantages of non-limiting example embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
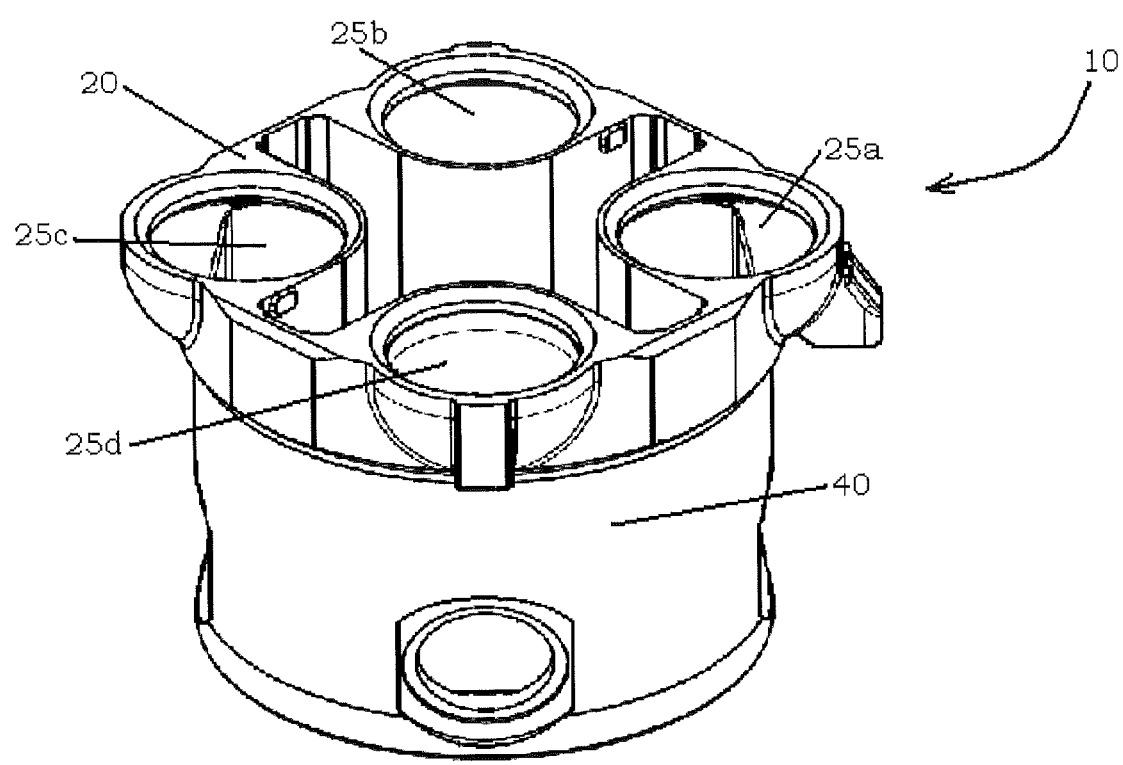
FIG. 1 is a perspective view of a fuel support casting in accordance with example embodiments.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the tee ins first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and inter mediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a fuel support casting 10 according to example embodiments. The fuel support casting 10 may include a lower barrel section 40 attached to an interface plate 20. In operation, the interface plate 20 may interface with four nuclear fuel bundles at orifices 25a, 25b, 25c, and 25d.

Figure 2:
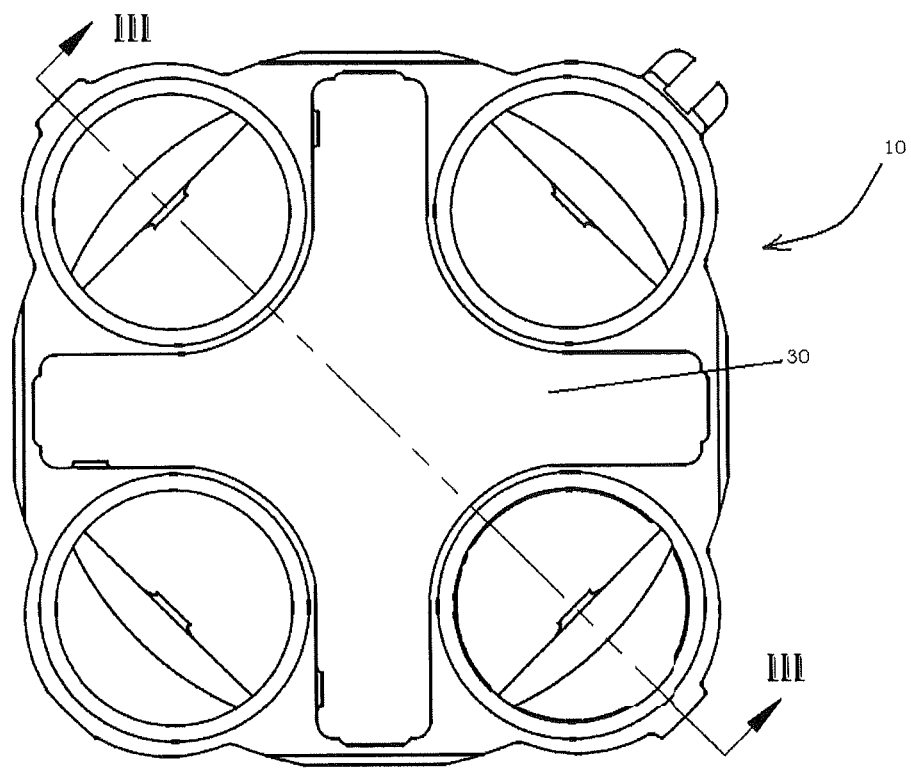
FIG. 2 is a top view of the fuel support casting in accordance with example embodiments.

FIG. 2 is a plan view of the fuel support casting 10. As shown in FIG. 2, the fuel support casting 10 includes a cruciform space 30 which penetrates the fuel support casting 10. In example embodiments, the cruciform space 30 may be configured to allow a cruciform shaped control rod to pass there through to regulate the nuclear activity of control rods that may be housed in the aforementioned fuel assemblies.

Figure 3:
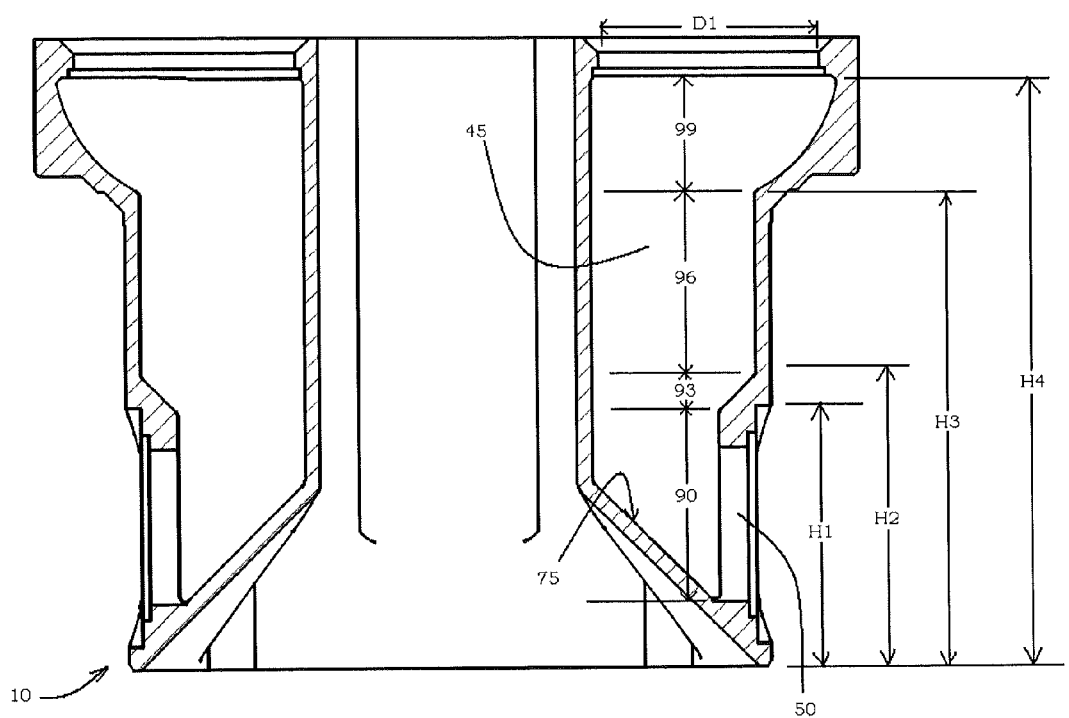
FIG. 3 is a section view along line of FIG. 2 of the fuel support casting in accordance with example embodiments.

FIG. 3 is a cross-section of the fuel support casting 10 illustrated in FIGS. 1 and 2. As shown in FIG. 3, the fuel support casting 10 may include four channels 45 (two of which are illustrated in FIG. 3) which guide water to the fuel bundles via the orifices 25a, 25b, 25c, and 25d. The four channels 45 are formed by internal surfaces of the fuel support casting 10. Because each of the four channels 45 may be identical, only one of channels will be explained in detail for the sake of brevity.

As shown in FIG. 3, water may enter the fuel support casting 10 via a lower orifice 50 which may resemble a circular hole in a lower part of the barrel portion 40 of the fuel support casting 10. In example embodiments, water may enter a channel 45 via the lower orifice 50 and may initially enter into a lower portion of the channel 45. The lower portion of the channel may be formed by internal surfaces of the support casting 10. For example, as shown in FIG. 3, a bottom of the channel 45 may be defined by an internal surface 75 of the fuel support casting 10. As shown in FIG. 3, the internal surface 75 may be inclined. For example, the bottom surface 75 may be inclined at an angle of approximately 45 degrees with respect to the flow of water entering the fuel support casting 10 from the lower orifice 50. Because the internal surface 75 may be inclined with respect to a flow of water entering the fuel support casting 10, the water entering the fuel support casting 10 may be redirected by the internal surface 75 to the fuel assemblies that may be interfaced with the interface plate 20.

As shown in FIG. 3, cross-sections of a channel 45 may change from a bottom of the fuel support casting 10 to a top of the fuel support casting. For example, H1 represents a height of a first portion 90 of the channel 45 as measured from a bottom of the fuel support casting 10. As shown in the figures, the internal surface 75 defines a bottom of the channel 45 and thus defines a bottom of the first portion 90. The first portion 90, however, may be further defined by two other surfaces. The first surface, which is arranged to face a center of the fuel support casting 10, may form a semicircular surface, as shown in FIG. 2, while a second surface defining the first portion 90, may be formed away from a center of the fuel support casting 10 and may be formed to be substantially flat. This latter surface may include the orifice 50 which may allow water to enter the channel 45. Thus, the first portion 90 of the channel 45 may include a flat inclined bottom 45, a back semicircular wall arranged near the center of the fuel support casting 45, and a third flat surface arranged away from the center of the fuel support casting 45. As described earlier, the third flat surface may include the orifice 50 to allow water to enter the fuel support casting 10.

The channel 45 may also include a second portion 93 on the first portion 90 and the second portion 93 may occupy that portion of the channel 45 between H1 and H2 as shown in FIG. 3. The second portion may include a back surface which may be arranged near the center of the fuel support casting 10 and a front surface arranged away from the center of the fuel support casting 10. The front surface may be inclined thus allowing a cross-section of the second region to increase from H1 to H2. As shown in FIG. 2, the latter surface may transition the channel 45 from having a flat straight wall at H1 to an arcuate shaped wall at H2.

The channel 45 may also include a third portion 96 on the second portion 93 and the third portion 96 may occupy a region of the channel 45 between H2 and H3 as shown in FIG. 3. The third portion 96 may include a back surface which may be arranged near the center of the fuel support casting 10 and a front surface arranged away from the center of the fuel support casting 10. The front surface, as shown in FIGS. 2 and 3, may be arc shaped and may be constant from heights H2 to H3. Thus, a cross-section of the third portion 96 may be constant.

The channel 45 may also include a fourth portion 99 on the third portion 96 and the fourth portion 99 may occupy a region of the channel between H3 and H4 as shown in FIG. 3. The fourth portion 99 may include a back surface which may be arranged near the center of the fuel support casting 10 and a front surface arranged away from the center of the fuel support casting 10. The front surface may be arc-shaped along a length of the channel 45 thus allowing a cross-section of the fourth portion 99 to increase from H3 to H4. As shown in FIG. 2, the latter surface may transition from an arc shape at H3 to a semi-circular shape at H4. In example embodiments, the top of the fourth portion 99 may have a diameter D1 as shown in FIG. 3.

As explained previously, water may enter channel 45 via the orifice 50 and may be directed upwards by the surface 75 to a top of the channel 45. In order to control the flow of water passing through a channel 45, example embodiments further includes a flow limiter that may be configured to be placed in at least one of the channels 45.

Figure 4:
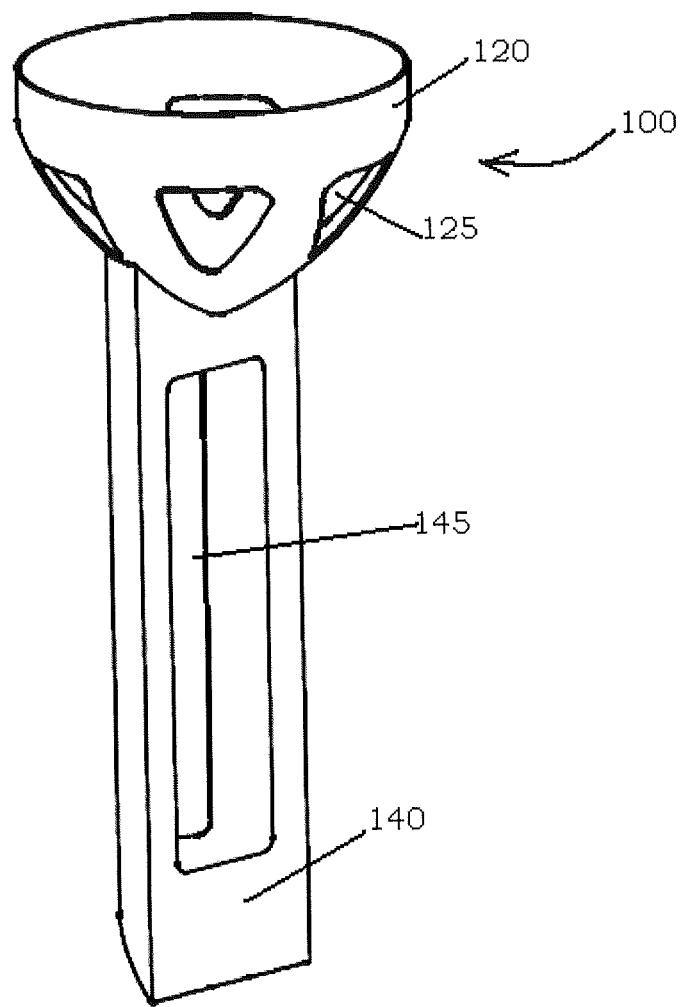
FIG. 4. is a perspective view of a flow limiter in accordance with example embodiments.
Figure 5:
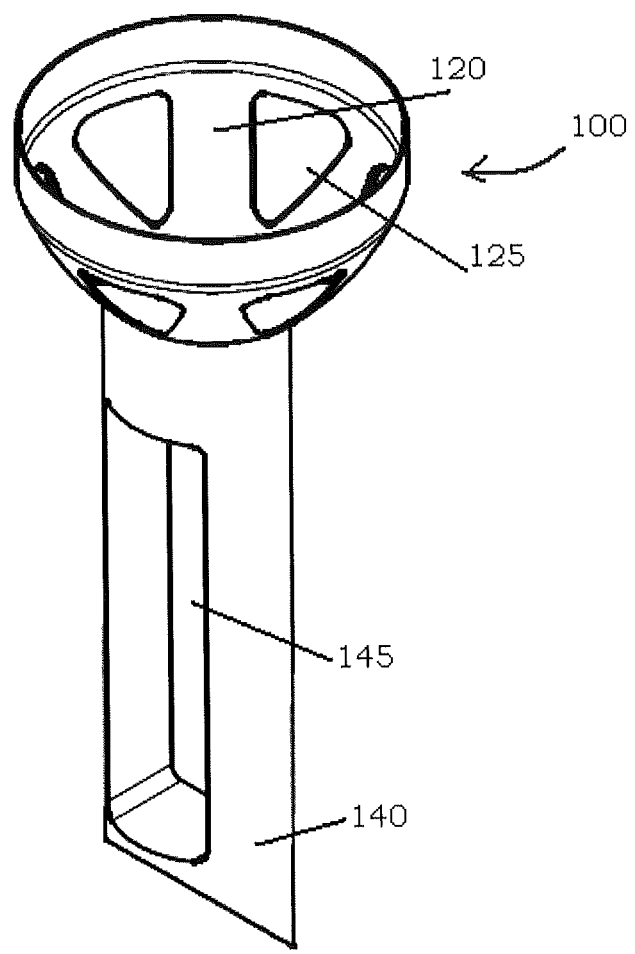
FIG. 5. is another perspective view of a flow limiter in accordance with example embodiments.
Figure 6:
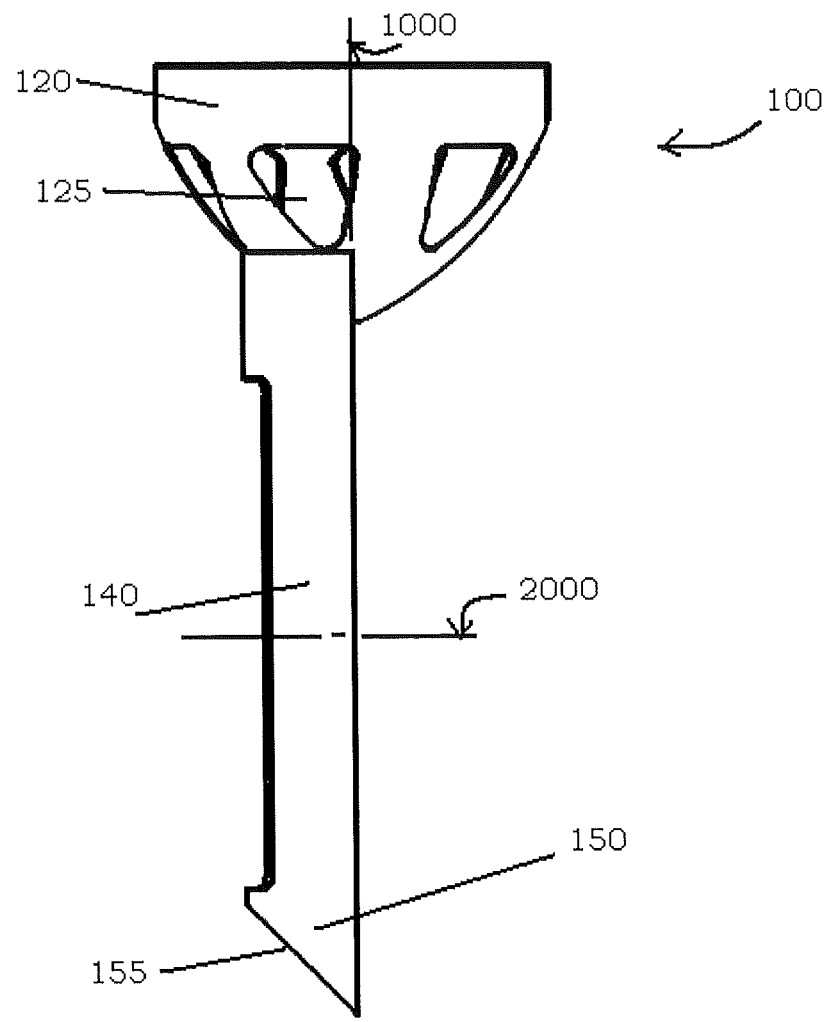
FIG. 6. is a side view of a flow limiter in accordance with example embodiments.
Figure 7:
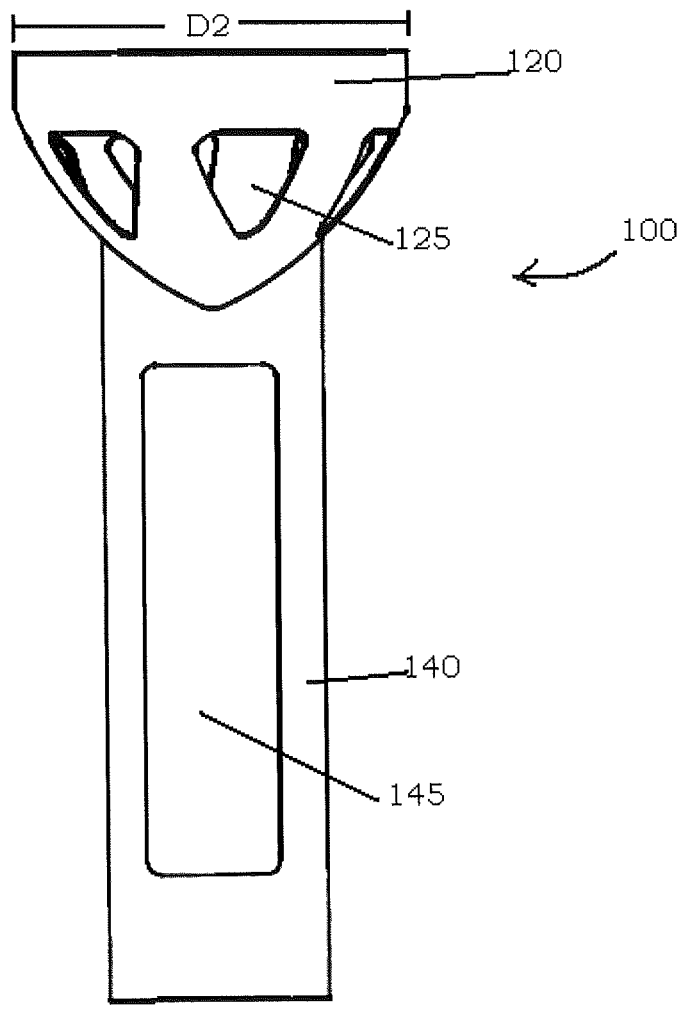
FIG. 7. is another side view of a flow limiter in accordance with example embodiments.

FIGS. 4-5 are perspective views of a flow limiter 100 according to example embodiments. FIG. 6 is a side view of the flow limiter 100 according to example embodiments. FIG.

Figure 8:
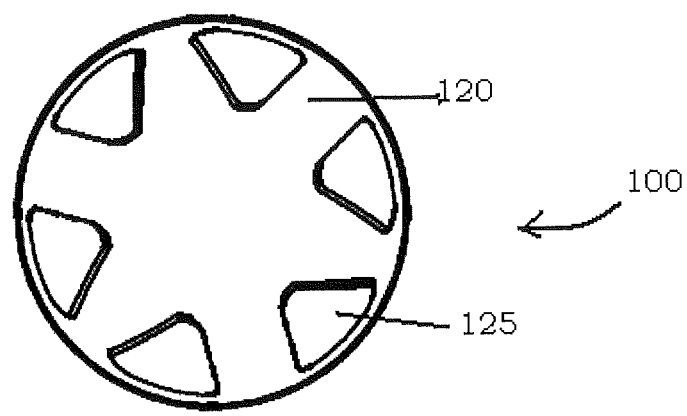
FIG. 8. is a plan view of a flow limiter in accordance with example embodiments.

7 is a front view of the flow limiter 100 according to example embodiments. FIG. 8 is a top view of the flow limiter 100 according to example embodiments.

As shown in FIGS. 4-8, the flow limiter 100, according to example embodiments, may include a head 120 and a fin 140. The head 120 may have a funnel shape wherein the sides of the head 120 have an arcuate profile and a top of the head 120 may be circular as shown in FIG. 8 and may have a diameter of D2. In example embodiments, the diameter D2 of the head may be smaller than the diameter D1 of the fuel support casting. The head 120 may also include a plurality of openings 125 as shown in FIGS. 4-8. For example, FIGS. 4-8 illustrate the head 120 as including six triangular shaped openings 125. Although FIGS. 4-8 show six triangular shaped openings 125, example embodiments are not limited thereto. For example, there may be more or less than six openings. In addition, the openings may have shapes other than triangular. For example, openings 125 could be circular, oval, square, triangular, polygonal, or a combination thereof. In addition, the openings 125 may form a pattern other than that illustrated in the figures. For example, there may be a first plurality of openings formed near a top of the head 120 and a second plurality of openings formed below the first plurality of openings. In addition, the openings 125 may be provided at an equal spacing around a circumference of the head 120, however, example embodiments are not limited thereto as the openings 125 may be provided irregularly around the circumference of the head 120.

As shown in FIG. 6, the profile of the head 120 may include sides having an arcuate shape. A bottom of the head 120, therefore, may terminate in a point. In example embodiments, the head may be formed to be symmetric about a first axis 1000. However, example embodiments are not limited to a head having sides with an arcuate shape nor is it limited to a head being symmetric as shown in FIG. 6. For example, the head could have the shape of a hemisphere or may be elliptical, thus, the head 120 may be formed without a point on a bottom of the head 120. As another example, the sides of the head 120 may be flat and inclined thus forming a funnel. As yet another example, the flow limiter may also include protrusions or depressions which may render the limiter asymmetric about the axis 1000 or may be formed, in general, to be asymmetric.

In example embodiments, the flow limiter 100 may also include a fin 140. The fin 140 may extend from a bottom (or near bottom) of the head 120 and may include an opening 145 extending along a length of the fin 140 and having an axis 2000 which may be substantially perpendicular to the axis 1000 of the head 120. Although the flow limiter 100 according to example embodiments illustrates a fin 140 with only a single opening 145, example embodiments are not limited thereto. For example, rather than having a single opening 145, the fin could include a plurality of openings formed along a length of the fin 140.

In example embodiments the fin may have a cross-section having an arcuate profile, however, example embodiments are not limited thereto. For example, the fin may be relatively flat or may have a polygonal cross-section.

In example embodiments, the head 120 and the fin 140 may be made from stainless steel. For example, the head 120 and the fin 140 may be made from 316 stainless steel.

Figure 9:
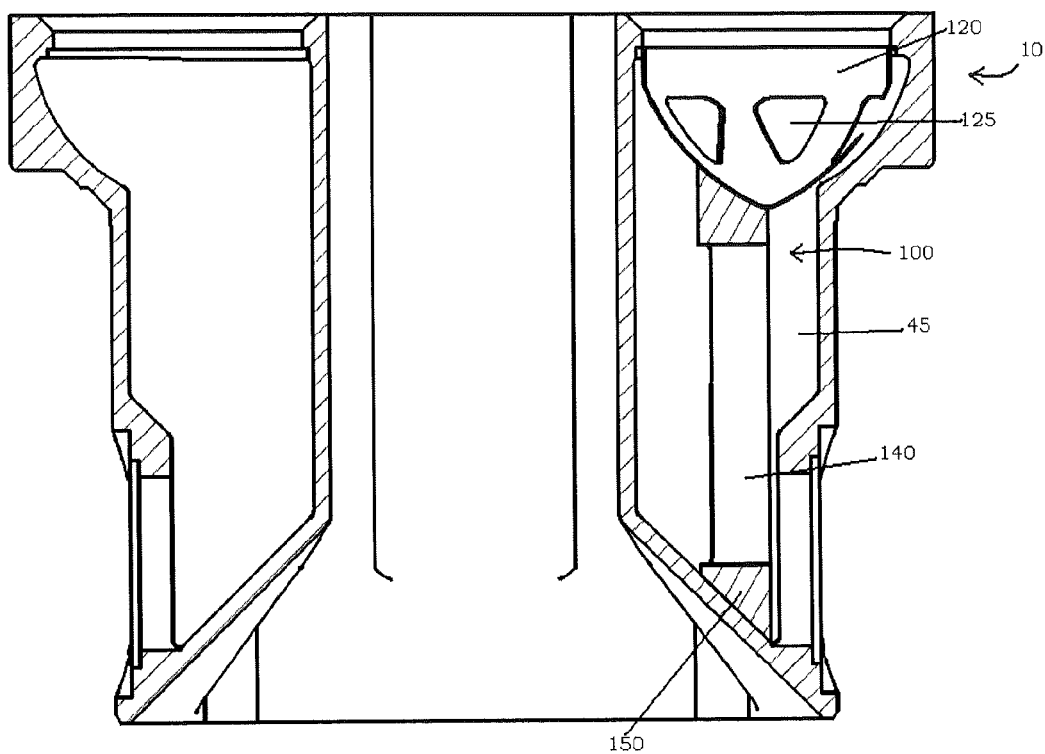
FIG. 9. is view of the flow limiter installed in a fuel support casting in accordance with example embodiments.

In example embodiments, the flow limiter 100 may be configured to reside within a channel 45 of the fuel support casting 10. FIG. 9, for example, illustrates the flow limiter 100 residing within a channel 45 of the fuel support casting 10. As shown in FIG. 9, the head 120 of the flow limiter 100 may be configured to fit mostly within the fourth portion 99 of the channel 45, however, example embodiments are not limited thereto as the head 120 of the flow limiter 100 may be configured to reside completely within the fourth portion 99 or may be configured to extend to a region below the fourth portion 99. In addition, as shown in FIG. 9, a bottom 150 of the fin 140 may be configured to contact the inclined surface 75 within the fuel support casting 10. Thus, the bottom 150 of the fin may also include an inclined surface 155 configured to engage the inclined surface 75 of the fuel support casting 10. Thus, the fin 140 may be configured to support the flow limiter 100 in the channel 45.

Once installed, the flow limiter 100 may limit flow of water to a fuel assembly. For example, as water enters the channel 45, the flow of water may be restricted due to the presence of the flow limiter 100. In example embodiments, the flow may be controlled by the sizes of the openings 125 and 145. For example, if the holes 125 and 145 are relatively small, the flow of water passing through the channel 45 is relatively small, whereas, the greater the size of the openings 125 and 145, the greater the flow of water passing through the channel 45 and to a fuel bundle. Thus, the flow limiter 100 may be configured to limit the flow of water passing through a channel by limiting the sizes of holes 125 and 145 in the flow limiter 100.

While example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed as:

1. A flow limiter comprising:
a head including a side surface having at least one first hole, the side surface being symmetric about a first axis; and
a fin extending from a bottom of the head, the fin including at least one second hole, the at least one second hole having an axis substantially perpendicular to the first axis,
wherein the side surface has a cross-section which decreases from a top of the head to the bottom of the head.

2. The flow limiter of claim 1, wherein the side surface has an arcuate profile and the at least one first hole is a plurality of first holes formed through the side surface.

3. The flow limiter of claim 2, wherein the at least one second hole is a single second hole.

4. The flow limiter of claim 1, wherein the fin includes a bottom portion having an inclined surface.

5. The flow limiter of claim 4, wherein the inclined surface is inclined, with respect to a length of the fin, about 45 degrees.

6. The flow limiter of claim 1, wherein the side surface has an arcuate shape.

7. The flow limiter of claim 6, wherein the arcuate shape is an elliptical shape.

8. The flow limiter of claim 6, wherein the arcuate shape forms a hemisphere.

9. The flow limiter of claim 1, wherein the at least one first hole is a plurality of triangular holes provided at an equal spacing around a circumference of the head.

10. A flow limiter comprising:
a head including a side surface having at least one first hole, the side surface being symmetric about a first axis; and a fin extending from a bottom of the head, the fin including at least one second hole, the at least one second hole having an axis substantially perpendicular to the first axis, wherein a bottom of the fin is configured to contact a surface of a fuel support casting.

11. A system including:

a fuel support casting having at least one channel; and a flow limiter in the at least one channel, the flow limiter including a head including a side surface having at least one first hole, the side surface being symmetric about a first axis which is parallel to an axis of the at least one channel; and a fin extending from a bottom of the head, the fin including at least one second hole, the second hole having an axis substantially perpendicular to the first axis.

12. The system of claim 11, wherein a bottom of the channel of the fuel support casting is defined by a surface of the fuel support casting and the fin contacts the surface of the fuel support casting.

13. The system of claim 12, wherein the surface of the fuel support casting is inclined with respect to an axis of the at least one channel and the fin includes a bottom surface parallel to the surface of the fuel support casting.

14. The system of claim 12, wherein the fin extends in a direction parallel to the axis of the at least one channel.

15. The system of claim 12, wherein the fin supports the flow limiter.

16. The system of claim 11, wherein the side surface of the flow limiter has an arcuate shape.

17. The system of claim 16, wherein the arcuate shape is an elliptical shape.

18. The system of claim 16, wherein the arcuate shape forms a hemisphere.

19. The system of claim 11, wherein the at least one first hole is a plurality of triangular holes provided at an equal spacing around a circumference of the head.

* * * * *